(12) United States Patent
Kushida

(10) Patent No.: US 7,466,279 B2
(45) Date of Patent: Dec. 16, 2008

(54) COMMUNICATION DEVICE FOR SMALL VEHICLES

(75) Inventor: Kazumitsu Kushida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 11/245,176

(22) Filed: Oct. 7, 2005

(65) Prior Publication Data

US 2006/0077111 A1 Apr. 13, 2006

(30) Foreign Application Priority Data

Oct. 7, 2004 (JP) ............................. 2004-295402

(51) Int. Cl.
*H01Q 1/32* (2006.01)
(52) U.S. Cl. ...................... 343/713; 343/715
(58) Field of Classification Search ................. 343/711, 343/712, 713, 715
See application file for complete search history.

(56) References Cited

U.S. PATENT DOCUMENTS

| | | | |
|---|---|---|---|
| 4,447,069 A * | 5/1984 | Winiecki et al. ............ | 280/270 |
| 4,560,196 A | 12/1985 | Carter, Sr. | |
| 4,632,354 A | 12/1986 | Asciutto | |
| 5,186,423 A * | 2/1993 | Wakayama et al. ......... | 248/160 |
| 5,222,752 A * | 6/1993 | Hewitt ..................... | 280/288.4 |
| 6,298,943 B1 * | 10/2001 | Yamada et al. ............. | 181/156 |
| 2003/0214447 A1 * | 11/2003 | Sasagawa et al. ........... | 343/713 |
| 2004/0217906 A1 * | 11/2004 | Ishibayashi et al. ......... | 343/713 |

FOREIGN PATENT DOCUMENTS

JP 63-91991 U 6/1988

* cited by examiner

*Primary Examiner*—Tho G Phan
(74) *Attorney, Agent, or Firm*—Birch, Stewart, Kolasch & Birch, LLP

(57) ABSTRACT

A communication device for small vehicles includes a single communication device that transmits signals in all directions without being interfered with by a passenger. A communication range of an electromagnetic wave with high directivity, which is susceptible to environmental conditions, can be enlarged as much as possible. The communication device, which performs at least one of sending or receiving signals, is disposed above a passenger seated on a seat of the small vehicle.

20 Claims, 6 Drawing Sheets

COMMUNICATION DEVICE FOR SMALL VEHICLES

CROSS-REFERENCE TO RELATED APPLICATIONS

This nonprovisional application claims priority under 35 U.S.C. § 119(a) on Patent Application No. 2004-295402, filed in Japan on Oct. 7, 2004, the entirety of which is incorporated herein by reference.

BACKGROUND OF THE INVENTION

1. Field of the Invention

The present invention relates to a communication device for a small vehicle. In particular, the present invention relates to a communication device such as an antenna for a two-wheeled vehicle or a three-wheeled vehicle.

2. Description of Background Art

In a motorcycle or other small vehicle, an antenna may intercept a field of view when it is located at the front of a vehicle body. Therefore, antennas in small vehicles are typically mounted to a rear portion of the vehicle body (for example, see JP-UM-A-63-91991).

The antenna disclosed in the JP-UM-A-63-91991 document is provided on a right side portion of a motorcycle behind the seat so as to project upward and rearward at a slightly oblique angle.

Although it is not entirely clear from the JP-UM-A-63-91991 document, the antenna is adapted to catch electric waves of a wireless communication device or electric waves from a radio station that have a relatively long wavelength and a low directivity. Therefore, a passenger such as a rider or nearby buildings does not interfere with these waves. In view of this, the antenna can be provided behind the passenger seated on the seat so as to project therefrom without any problem.

However, in the case of an antenna for transmitting signals between vehicles for detecting positions of the vehicles with respect to each other, carrier waves in an extremely high-frequency wave band that transmit a large amount of data are transmitted. The carrier waves are high in directivity and are therefore interfered with by a passenger or nearby buildings. In the case of electromagnetic waves such as light, the waves are further interfered with by a passenger or nearby buildings.

In particular, when a passenger interferes with electric wave reception, the range on the passenger side from the antenna becomes an incommunicatable range. Therefore, in order to enable communication in all directions, the antenna must be arranged at a higher position than the passenger. Alternatively, at least two antennas must be arranged at the front and rear, or the left and right positions of the vehicle body to avoid a lack of communication in some directions.

When an antenna is arranged at a higher position, an arrangement at the front, left, and right side of the vehicle body is a hindrance. Therefore, an antenna that is arranged at a higher position is typically arranged at the rear portion of the vehicle body.

Even when an antenna is arranged at a higher position at the rear portion of the vehicle body, the communication range is reduced due to the existence of nearby buildings on the left and right sides, for example, just before the vehicle enters into an intersecting road at a blind corner that is situated in an environment that has buildings on the left and right sides.

SUMMARY OF THE INVENTION

In view of the above, it is an object of the present invention to provide a communication device for small vehicles in which the transmission of signals is enabled with a single communication device in all directions without being interfered with by a passenger. In addition, it is an object of the present invention to increase a communication range for an electromagnetic wave that has a high directivity that may be affected by environmental conditions.

In order to achieve the above-described object, according to a first aspect of the present invention, a communication device for small vehicles, such as a two-wheeled vehicle or a three-wheeled vehicle is provided. The communication device is disposed above a passenger seated on a seat and includes at least one type of communication device for carrying out at least one of sending or receiving of signals.

According to a second aspect of the present invention, a pillar member including a vertical stay extending upward from behind the seat and a horizontal member bent at an upper end of the vertical stay and extending forward is provided. The communication device is disposed at a front portion of the horizontal member of the pillar member.

According to a third aspect of the present invention, one of the communication devices is an inter-vehicle communication antenna for detecting positions of the vehicles by transmitting signals between the vehicles.

According to a fourth aspect of the present invention, one of the communication devices is a GPS antenna.

According to a fifth aspect of the present invention, one of the communication devices is an LED arranged so as to emit light toward the front.

According to a sixth aspect of the present invention, the LED is a white LED or a near-infrared ray LED.

According to a seventh aspect of the present invention, a rear-surveillance camera is provided on a rear surface of the vertical stay of the pillar member at a predetermined height.

According to the first aspect of the present invention, at least one type of communication device for carrying out at least one of sending or receiving of signals is disposed above the passenger seated on the seat. Therefore, one communication device for each type is arranged at a high position above the passenger and hence transmission of signals is enabled in all directions without being interfered with by the passenger. In addition, the communication device is located at a position on the vehicle body as forward as possible above the passenger. Therefore, the communication range of an electromagnetic wave that has a high directivity can be enlarged as much as possible. In particular, the communication range at an intersection in an environment that has high buildings on both sides can be increased.

According to the second aspect of the present invention, the pillar member for supporting the communication device includes a vertical stay extending upward from behind the seat and a horizontal member bent at the upper end of the vertical stay and extending forward. Therefore, the passenger can get on and off of the vehicle from both left and right sides without any problems.

According to the third aspect of the present invention, an inter-vehicle communication antenna for detecting the positions of the vehicles by transmitting signals between vehicles is disposed above the passenger at the front portion of the horizontal member of the pillar member. Carrier waves in an extremely high-frequency wave band that transmit a large amount of data are transmitted from the inter-vehicle communication antenna for detecting the positions of the vehicles by transmitting signals between vehicles. Therefore, the directivity of the electric wave is high, and the buildings are apt to interfere with the electric waves. However, since the inter-vehicle communication antenna is arranged above the passenger at the position of the vehicle body as forward as possible, the communication range of an electromagnetic wave that has a high directivity can be enlarged as much as possible. The increase in the communication range is especially advantageous when the vehicle is at an intersection in an environment that has high buildings on both sides.

According to the fourth aspect of the present invention, the GPS antenna is disposed above the passenger on the horizontal member of the pillar member. Therefore, the reception of electric waves from a satellite is ensured.

According to the fifth aspect of the present invention, the LED is arranged above the passenger so as to face forward. Therefore, when a car coming from the opposite direction takes an image from the front of the vehicle body by a CCD camera, for example, a C-MOS camera, the LED can be recognized via a monitor at a position higher than the passenger. However, when an LED is additionally arranged on a lower portion of the vehicle body, a plurality of LEDs arranged at a large distance from each other can easily be recognized from a long distance.

According to the sixth aspect of the present invention, the LED is a white LED or a near-infrared ray LED. When a white LED is used as the LED, it emits visible light. Therefore, it is visible to a human being and can be picked-up by the CCD camera and viewed via a monitor. When a near-infrared ray LED is used as the LED, it is invisible to a human being. However, it can still be picked-up by the CCD camera and viewed via a monitor.

According to the seventh aspect of the present invention, a rear-surveillance camera is provided on a rear surface of a vertical stay of the pillar member at a predetermined height. Therefore, a rearward image can be taken from an adequate height, and hence video on the monitor can easily be seen. This facilitates recognition of the conditions behind the vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
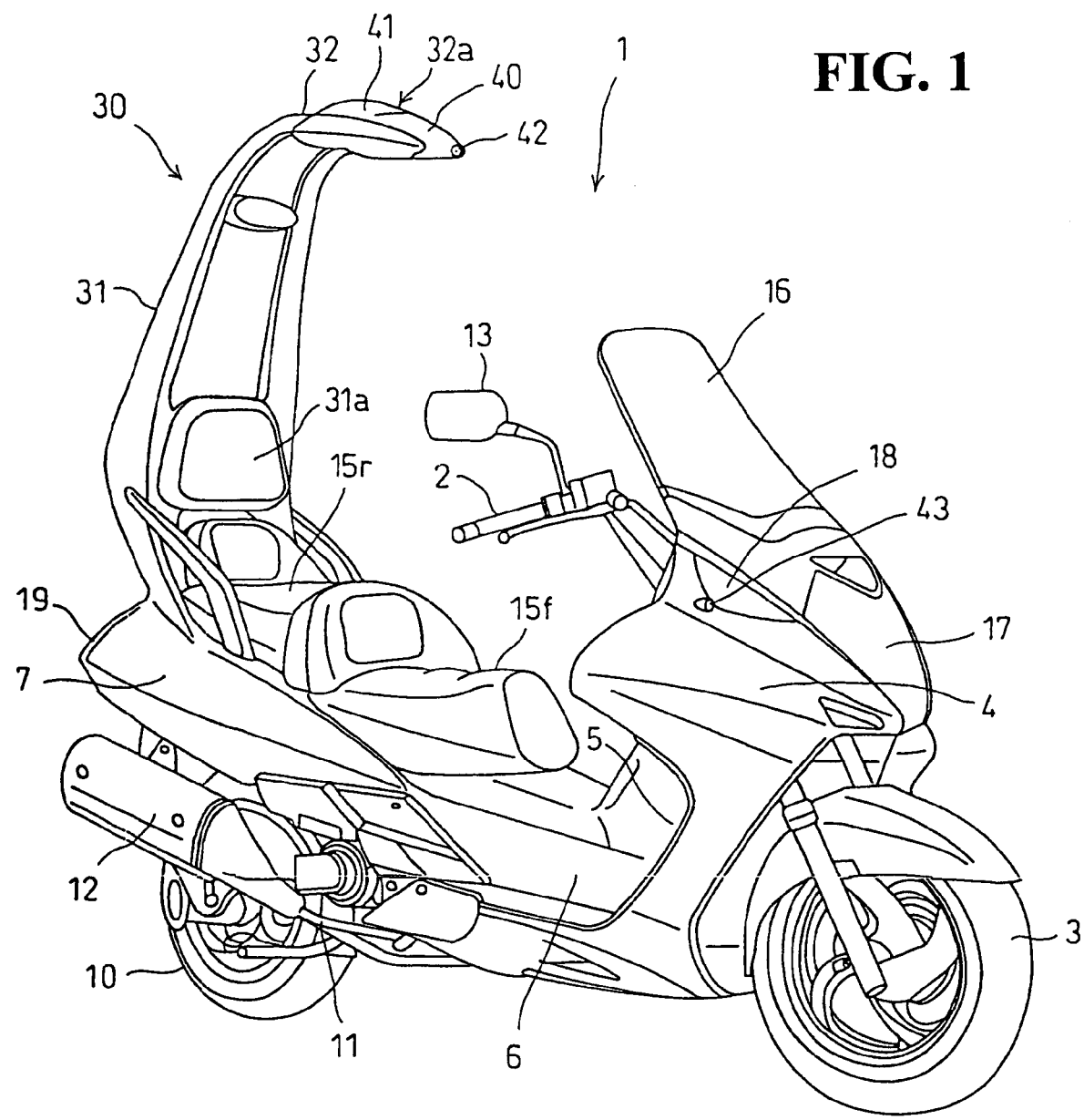
FIG. 1 is a general perspective view of a motorcycle according to an embodiment of the present invention.

The present invention will now be described with reference to the accompanying drawings, wherein the same reference numerals will be used to describe the same or similar elements throughout the several views.

Figure 2:
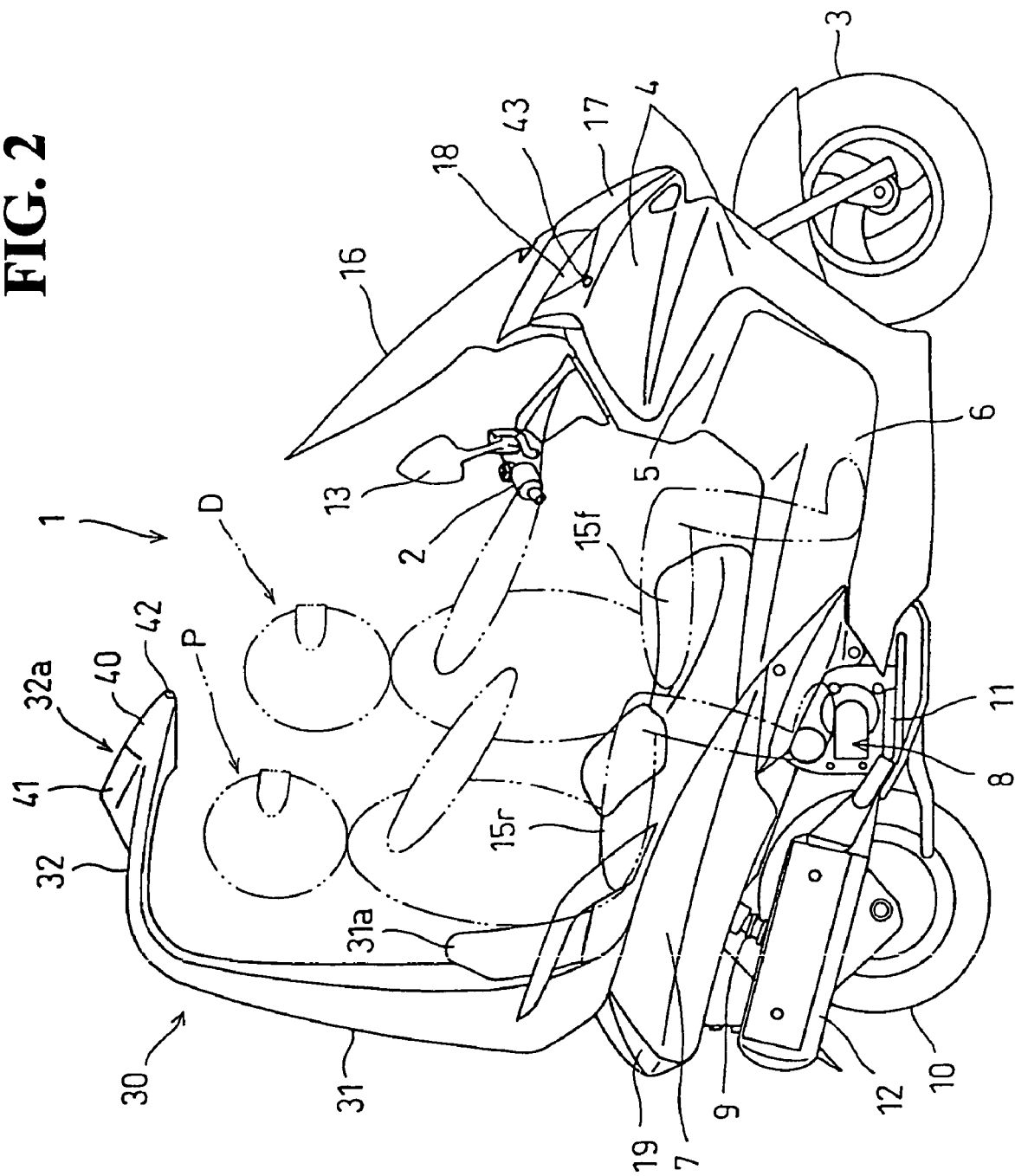
FIG. 2 is a side view of the motorcycle according to an embodiment of the present invention.
Figure 3:
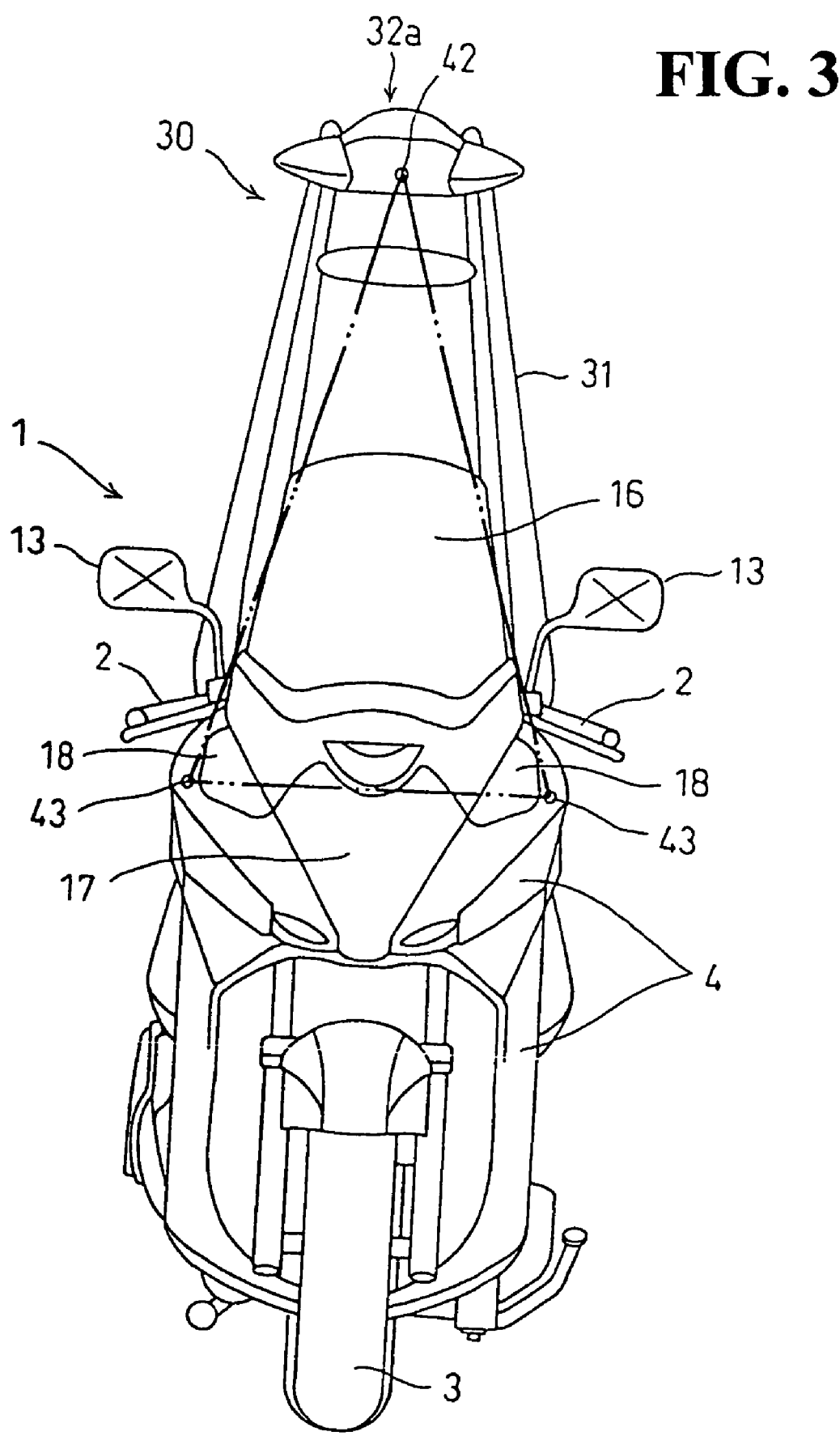
FIG. 3 is a front view of the motorcycle according to an embodiment of the present invention.
Figure 4:
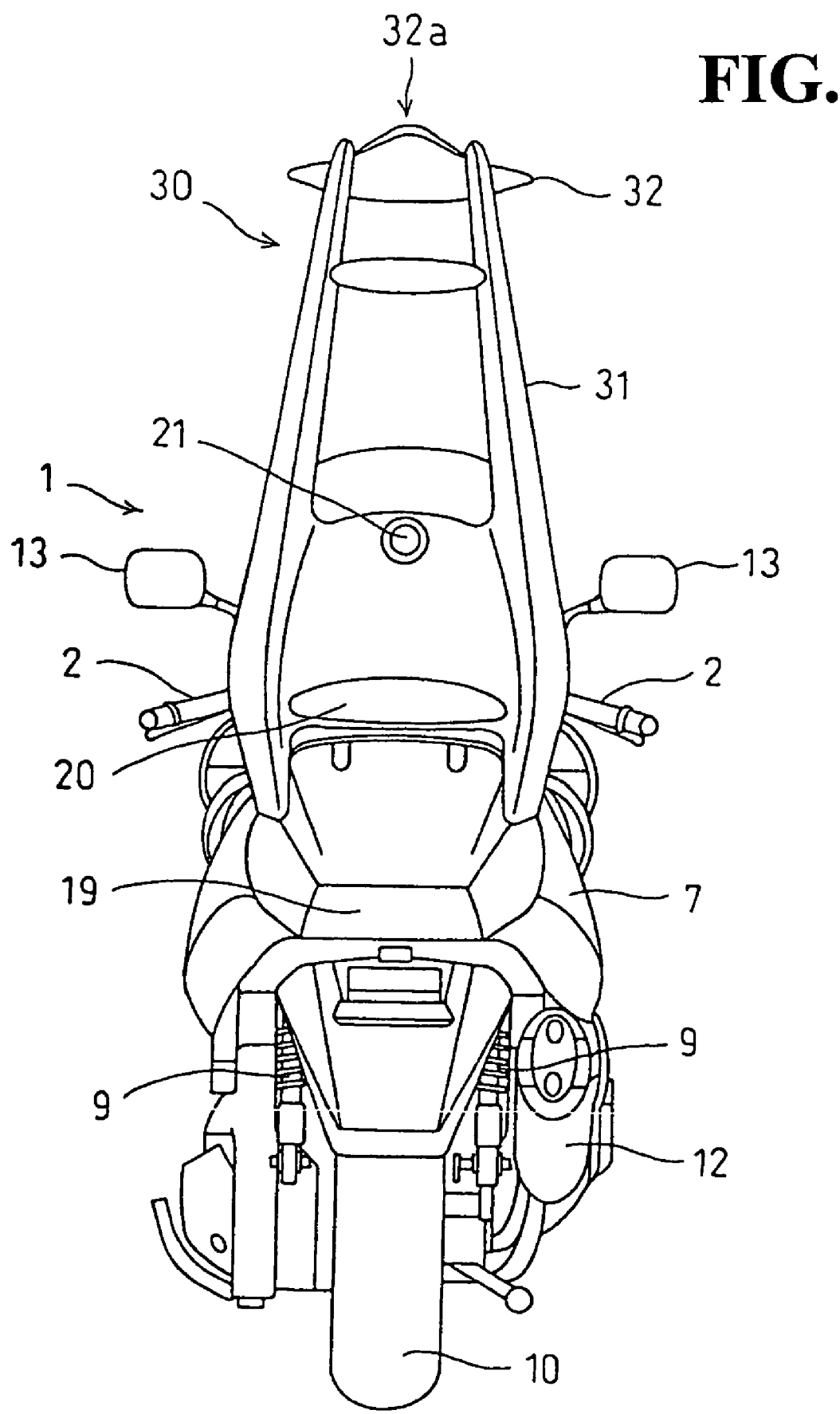
FIG. 4 is a rear view of the motorcycle according to an embodiment of the present invention.

Referring now to FIGS. 1 to 4, an embodiment of the present invention will be described. FIG. 1 is a perspective view of a motorcycle 1 to which a communication device according to this embodiment is applied. FIGS. 2, 3 and 4 are a side view, a front view and a rear view of the motorcycle of FIG. 1.

The motorcycle 1 is a two-seater motorcycle. However, it should be understood that the present invention is equally applicable to a one-seater motorcycle or other small vehicles. A front cover 4 and a leg shield 5 cover a steering system for steering a front wheel 3 by a handle 2. A step floor 6 for placing legs of a passenger extends rearward from a lower portion of the leg shield 5. A body cover 7 extends further rearward and obliquely upward from the step floor 6.

A swing-type power unit 8 is provided below the body cover 7 so as to be capable of pivotal movement in the vertical direction about a front end thereof. A rear wheel 10 is journaled behind the power unit 8, mounted to a vehicle body frame with the intermediary of a rear cushion 9.

An exhaust muffler is provided on a right side of the rear wheel 10. The exhaust muffler 12 is in communication with an exhaust pipe 11 extending from an internal combustion engine. The exhaust muffler 12 is provided in front of the power unit 8.

A seat including a front seat 15$f$ and a rear seat 15$r$ continuing from the front to the rear side is provided above the body cover 7. A driver D is seated on the front seat 15$f$ and a passenger P is seated on the rear seat 15$r$. FIG. 1 shows the driver D and the passenger P seated on the respective seats by double-dashed chain lines.

A windscreen 16 extends upward and obliquely rearward from an upper edge of the front cover 4. A headlight 17 is provided on an upper portion of the front cover 4 extending forward from a center of the windscreen 16. Winker lights (blinkers or turn signal lights) 18, 18 are provided behind the headlight 17 on left and right sides thereof.

White LEDs 43, 43 are provided on the left and right sides of the winker lights 18, 18 so as to emit light toward the front (see FIG. 3). Rear view mirrors 13, 13 are mounted around the base of left and right grips on the handle 2. A rear combination light 19 is disposed at a rear end of the body cover 7.

A pillar member 30 is provided on a rear portion of the body cover 7 at a position behind the rear seat 15$r$ and above the rear combination light 19 so as to extend upward. The pillar member 30 includes a vertical stay 31 extending upward from behind the rear seat 15$r$ and a horizontal member 32 bent at an upper end of the vertical stay 31 and extending forward.

Referring now to FIG. 2, the rear seat 15$r$ and the vertical stay 31 and the horizontal member 32 of the pillar member 30 define a C-shaped riding space in side view. The horizontal member 32 is located horizontally at about 180 cm from the ground, which is a height that provides sufficient room above the head of the passenger P seated on the rear seat 15$r$, which is slightly higher than the front seat 15$f$. Therefore, the driver D as well as the passenger P can get on and off from the side of the motorcycle 1 without difficulty.

The horizontal member 32 is positioned in such a manner that a front end that extends forward is located substantially above the head of the driver D seated on the front seat 15f. The horizontal member 32 extends forward to substantially a center position of the vehicle body in the fore-and-aft direction.

A lower portion of a front surface of the vertical stay 31 fixed to the vehicle body in a vertical posture serves as a seat back 31a of the passenger P (see FIG. 1). A rear surface of the vertical stay 31 is provided with a tail lamp 20 at the lower portion thereof as shown in FIG. 4. A rear-surveillance camera 21 is attached so as to face rearward at a midpoint in height, whereby the rear view can be imaged.

In the pillar member 30 as described above, the horizontal member 32 is formed with a swelled portion 32a swelling upward in the shape of a mountain at a front half portion thereof. An inter-vehicle communication antenna 40 is disposed within the swelled portion 32a at a front portion thereof. A GPS antenna 41 is disposed on top of the swelled portion 32a. A white LED 42 is provided at a center of a front edge of the horizontal member 32 at a front end of the swelled portion 32a so as to emit light toward the front.

In this manner, one of each type of communication device, such as the inter-vehicle communication antenna 40, the GPS antenna 41 and the white LED 42, are arranged together in the swelled portion 32a at the front of the horizontal member 32 of the pillar member 30. Therefore, the inter-vehicle communication antenna 40, the GPS antenna 41, and the white LED 42 are located above the heads of the driver D and the passenger P.

The inter-vehicle communication antenna 40 constitutes part of an inter-vehicle communication system. Since the inter-vehicle communication system detects the positions or types of a plurality of vehicles traveling around the vehicle in question, it must transmit a large amount of data, such as identification codes or positional information, in a short time. Therefore, a carrier wave in an extremely high-frequency wave band is used as the carrier wave for carrying the large amount of data.

The extremely high-frequency wave has a high directivity and hence interferes with the passenger or nearby buildings. However, since the inter-vehicle communication antenna 40 is disposed on the horizontal member 32, which covers the upper side of the driver D and the passenger P, transmission in all directions is achieved with one inter-vehicle communication antenna 40 without being interfered with by the passengers.

In the case of the inter-vehicle communication antenna 40, the extremely high-frequency wave has a high directivity. Therefore, it sends signals toward the front, which is where the signals are mostly required. In view of this, an effective communication range is in the range of about 120 degrees in front. With regard to the receipt of the communication waves, since the inter-vehicle communication antenna 40 is located at a position higher than the passengers, all directions are effective.

Figure 5:
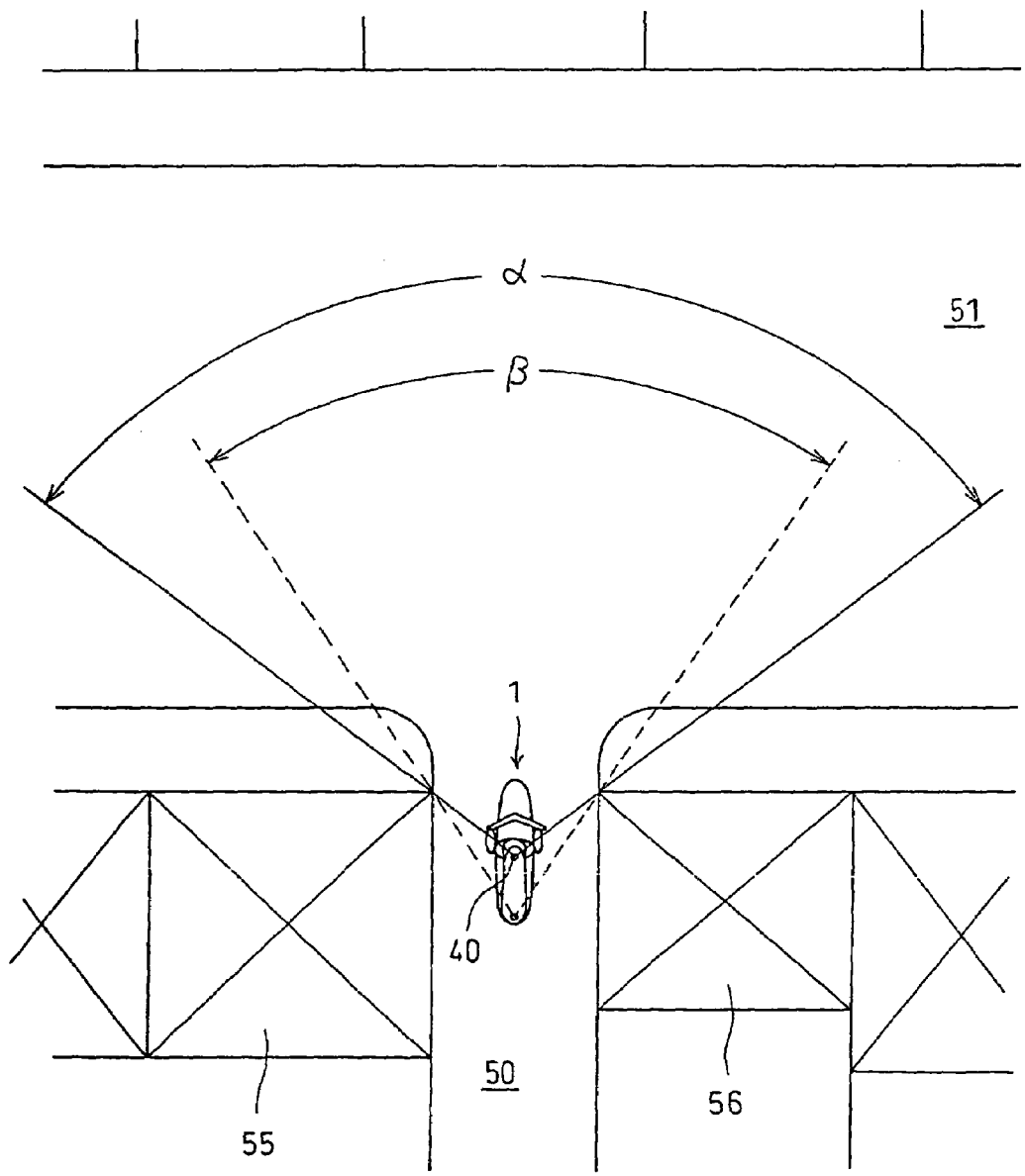
FIG. 5 is a schematic plan view of a road where the motorcycle according to an embodiment of the present invention travels.

As shown in FIG. 5, when the motorcycle 1 enters a large arterial road 51 from a side road 50, if there are buildings 55, 56 on both sides of the side road 50, the communication range is limited. However, since the inter-vehicle communication antenna 40 is positioned at about the center of the vehicle body in the fore-and-aft direction above the passenger, the secured communication range is the shape of a fan α shown by a solid line in FIG. 5.

The fan shaped range α is a relatively wide range when compared to the background art. For example, when the communication device is provided on the rear portion of the vehicle body as in the case of the antenna in the background art, even when it is disposed at a position higher than the passenger, the communication range is a narrow range as shown by the fan-shaped range β in FIG. 5.

In this manner, by positioning the inter-vehicle communication antenna 40 above the passenger at a location near the center of the vehicle body in the fore-and-aft direction, the communication range can be enlarged as much as possible.

If the inter-vehicle communication antenna 40 is located further forward than the center of the vehicle body, it enters into the field of view of the driver D, distracting the driver D's concentration. Therefore, it is preferable to position the inter-vehicle communication antenna 40 forward to an extent that the field of view of the driver D is kept free of interference.

Since the GPS antenna 41 is disposed on the horizontal member 32 of the pillar member 30, which is located at a position higher than the passenger, reception of the electric waves from the satellite is ensured.

Also, the white LED 42 is positioned at the front end of the horizontal member 32, which is a position higher than the passenger. As described above, the white LEDs 43, 43 are located on the left and right sides of the winker lights 18, 18 on the front cover 4. Therefore, referring to FIG. 3, which is a front view of the vehicle body, when a car coming from the opposite direction takes an image from the front of the vehicle body by a CCD camera, for example, a C-MOS camera, the one white LED 42 located at the lateral center of the vehicle body at a position higher than the passenger and the two white LEDs 43, 43 located at the symmetrical position on the outer sides of the left and right winker lights 18, 18 constitute the apexes of a large longitudinally elongated isosceles triangle (shown by chain double-dashed line in FIG. 3). This isosceles triangle can be checked via a monitor.

In this manner, by identifying the type of the vehicle from the shape (light emitting pattern) constituted as apexes of the plurality of white LEDs from the image information on the monitor, or from the size of the shape, or the condition of deformation thereof, various information on the conditions or the states of the vehicle such as the distance or the direction of travel can be obtained.

The white LEDs 42, 43, 43 arranged on the present motorcycle 1 can provide information such that it is a motorcycle from the shape of the longitudinally elongated isosceles triangle, and since the upper white LED 42 is located at a position higher than the passenger and the distance from the white LEDs 43, 43 is large, so that they can form a large isosceles triangle. Therefore, the light-emitting pattern can be recognized from a pretty long distance.

It should be understood that the number and arrangement of the white LEDs 43, 43 may be contemplated in various ways in addition to the example shown above. For example, the white LEDs 43, 43 may be mounted to the left and right rear view mirrors 13, 13, respectively.

In any case, by arranging at least one of the white LEDs 43, 43 on the horizontal member 32 of the pillar member 30, which is at the position higher than the passenger, the vertical width of the shape formed by the plurality of white LEDs as apexes can be increased, thereby facilitating the recognition of the shape. The white LEDs emit visible light, and hence a human being can view directly.

It is also possible to employ near-infrared ray LEDs instead of the white LEDs. Although the near-infrared ray LED is invisible to the human eye, it can be recognized by taking an image by the CCD camera or the like and displaying on the monitor.

Since the tale lamp 20 is disposed on the vertical stay 31 of the pillar member 30 at a position higher than the tail lamp at the rear combination light 19 at the rear portion of the body cover 7, visibility is improved by the upper and lower tail lamps.

The rear-surveillance camera 21 is provided at a midpoint of the vertical stay 31 of the pillar member 30 in height. The rear view can be imaged from a suitable height, whereby the image on the monitor can easily be viewed, and thereby facilitating recognition of the conditions behind the vehicle body.

Subsequently, a modification of the pillar member 30 shown in the above-described embodiment will be illustrated in FIG. 6 and described below. The members other than a pillar member 70 are the same as those in the motorcycle 1 in the above-described embodiment, and hence the same members are represented by the same reference numerals.

Figure 6:
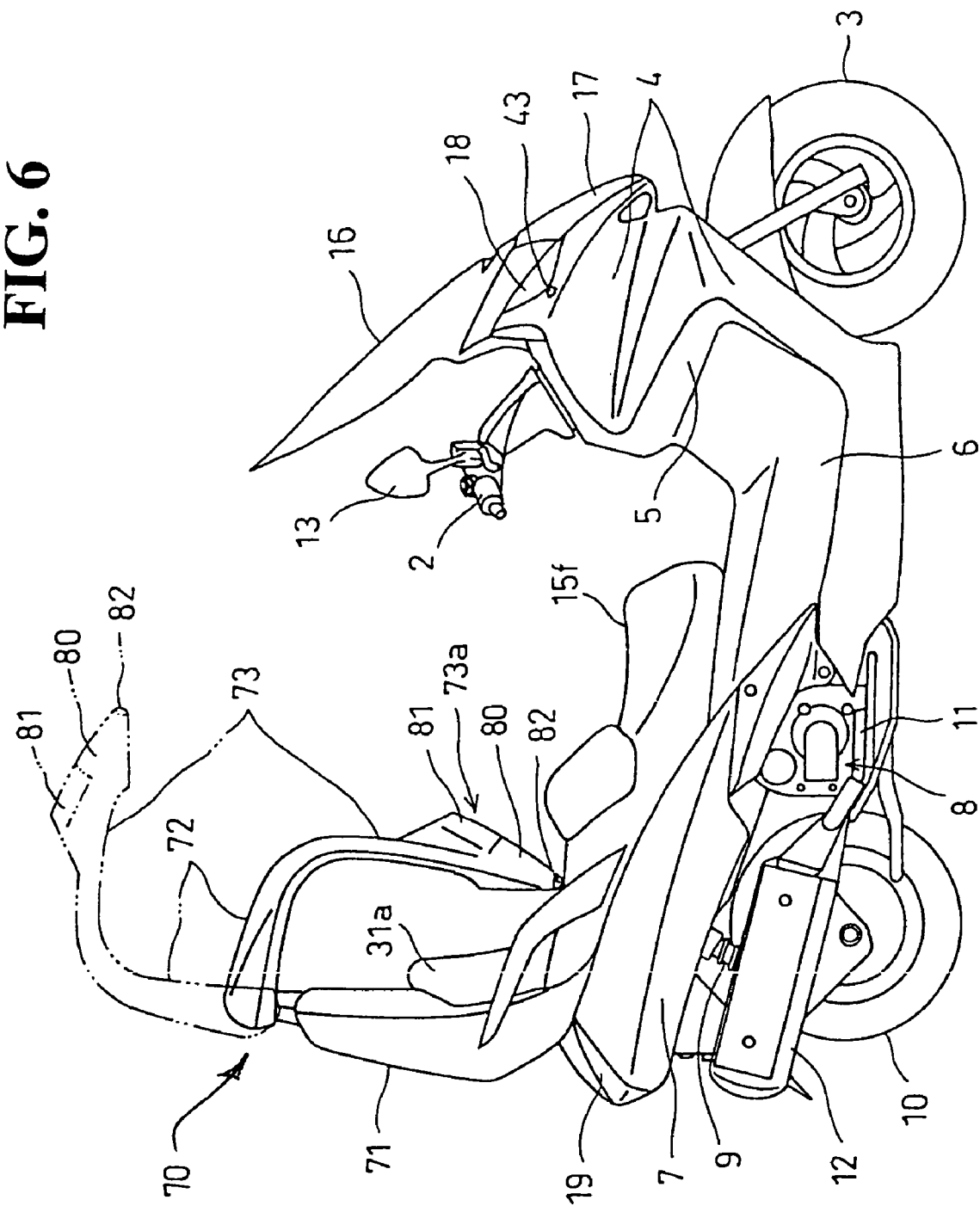
FIG. 6 is a general side view of a motorcycle according to an embodiment of the present invention showing a modification of a pillar member.

As shown in FIG. 6, the pillar member 70 includes divided upper and lower vertical stays. Connecting portions thereof rotatably connects the lower vertical stay 71 and the upper stay 72 to each other. The upper stay 72 is integrally formed with a horizontal member 73 in a state of being bent in an L-shape.

A swelled portion 73a is provided on a front portion of the horizontal member 73. An inter-vehicle communication antenna 80, a GPS antenna 81, and a white LED 82 are disposed as in the case of the previous embodiment.

A state in which the upper stay 72 is fixed to the lower vertical stay 71, which is integrally secured to the vehicle body frame so as to extend upwardly behind the rear seat 15r, in vertical direction in a posture aligned with the lower vertical stay 71 in a straight line is shown by a double-dashed chain line in FIG. 6. The pillar member 70 in this state is the same as the pillar member 30 in the previous embodiment, and has the same functions.

The upper stay 72 is fixed to an upper side of the lower vertical stay 71 in a posture extending straight upward. However, when this fixation is released, the upper stay 72 can be pivoted forward together with the horizontal member 73. As shown by a solid line in FIG. 6, it can be folded on the rear seat 15r into a compact shape. By folding the upper stay 72 and the horizontal member 73 as described above, a required parking space may be reduced.

While the pillar member is adapted to be applied to a motorcycle having no roof in the embodiments shown above, the roof can be utilized in the case of small two-wheel or three-wheel vehicles having a roof. Therefore, it is also possible to support the communication device such as the antenna on the roof, and the communication device may be disposed on the roof above the passenger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication device in a small vehicle, comprising:
   an accommodating member disposed above a passenger seated on a passenger seat of the small vehicle;
   a vertical stay extending upward from behind the passenger seat, the accommodating member extending from an upper end of the vertical stay along a horizontal direction toward a front end of the small vehicle; and
   at least one communication device for carrying out at least one of sending or receiving signals, said at least one communication device being disposed in the accommodating member.

2. The communication device in a small vehicle according to claim 1, wherein one of the at least one communication device is an inter-vehicle communication antenna for detecting a position of a vehicle by transmitting signals between vehicles.

3. The communication device in a small vehicle according claim 1, wherein one of the at least one communication device is a GPS antenna.

4. The communication device in a small vehicle according to claim 1, wherein one of the at least one communication device is an LED arranged so as to emit light toward the front.

5. The communication device in a small vehicle according to claim 4, wherein the LED is a white LED or a near-infrared ray LED.

6. The communication device in a small vehicle according to claim 1, wherein the accommodating member is disposed directly above the passenger seat which is behind a driver seat of the small vehicle.

7. The communication device in a small vehicle according to claim 1, wherein the at least one communication device is positioned at about the center of the small vehicle in a fore-and-aft direction of the small vehicle.

8. The communication device in a small vehicle according to claim 1, wherein the accommodating member is free of support from a direction at a bottom side thereof.

9. A communication device in a small vehicle, comprising:
   at least one communication device for carrying out at least one of sending or receiving signals, said at least one communication device being disposed above a passenger seated on a seat of the small vehicle; and
   a pillar member, said pillar member including a vertical stay extending upward from behind the seat and a horizontal member bent at an upper end of the vertical stay and extending forward,
   wherein said communication device is disposed at a front portion of the horizontal member of the pillar member.

10. The communication device in a small vehicle according to claim 9, wherein one of the at least one communication device is an inter-vehicle communication antenna for detecting a position of a vehicle by transmitting signals between vehicles.

11. The communication device in a small vehicle according claim 9, wherein one of the at least one communication device is a GPS antenna.

12. The communication device in a small vehicle according to claim 9, wherein one of the at least one communication device is an LED arranged so as to emit light toward the front.

13. The communication device in a small vehicle according to claim 12, wherein the LED is a white LED or a near-infrared ray LED.

14. The communication device in a small vehicle according to claim 9, further comprising:
   a rear surveillance camera, said rear-surveillance camera being provided on a rear surface of the vertical stay of the pillar member at a predetermined height.

15. A small vehicle, comprising:
   a body frame;
   a seat;
   a pillar member, said pillar member including a vertical stay extending upward from behind the seat and a horizontal member bent at an upper end of the vertical stay and extending forward; and at least one communication device for carrying out at least one of sending or receiving signals, said at least one communication device being disposed at a front portion of the horizontal member of the pillar member, directly above the seat.

16. The small vehicle according to claim 15, wherein one of the at least one communication device is an inter-vehicle communication antenna for detecting a position of a vehicle by transmitting signals between vehicles.

17. The small vehicle according claim 15, wherein one of the at least one communication device is a GPS antenna.

18. The small vehicle according to claim 15, wherein one of the at least one communication device is an LED arranged so as to emit light toward the front.

19. The small vehicle according to claim 18, wherein the LED is a white LED or a near-infrared ray LED.

20. The small vehicle according to claim 15, further comprising:
a rear surveillance camera, said rear-surveillance camera being provided on a rear surface of the vertical stay of the pillar member at a predetermined height.

* * * * *